US010475556B2

(12) United States Patent
Sirin et al.

(10) Patent No.: US 10,475,556 B2
(45) Date of Patent: Nov. 12, 2019

(54) SELF-SUPPORTING OVERHEAD TELECOMMUNICATION/POWER CABLE

(71) Applicant: PRYSMIAN S.P.A., Milan (IT)

(72) Inventors: Zekeriya Sirin, Milan (IT); Baris Sönmez, Milan (IT); Martin Vincent Davies, Milan (IT)

(73) Assignee: PRYSMIAN S.p.A., Milan (IT)

( * ) Notice: Subject to any disclaimer, the term of this patent is extended or adjusted under 35 U.S.C. 154(b) by 0 days.

(21) Appl. No.: 15/522,187

(22) PCT Filed: Oct. 31, 2014

(86) PCT No.: PCT/EP2014/073497
§ 371 (c)(1),
(2) Date: Apr. 26, 2017

(87) PCT Pub. No.: WO2016/066230
PCT Pub. Date: May 6, 2016

(65) Prior Publication Data
US 2017/0316852 A1 Nov. 2, 2017

(51) Int. Cl.
*H02G 7/05* (2006.01)
*H01B 11/22* (2006.01)
(Continued)

(52) U.S. Cl.
CPC .......... *H01B 11/22* (2013.01); *G02B 6/4422* (2013.01); *G02B 6/4429* (2013.01);
(Continued)

(58) Field of Classification Search
CPC .......... H02G 7/05; H02G 15/117; H02G 7/06; H01L 37/00; G02B 6/44; G02B 6/4401;
(Continued)

(56) References Cited

U.S. PATENT DOCUMENTS 5,095,176 A   3/1992  Harbrecht et al.
5,469,523 A * 11/1995  Blew .................... G02B 6/4403
                                                      385/101

(Continued)

OTHER PUBLICATIONS

International Search Report form the European Patent Office in corresponding International Application No. PCT/EP2014/073497 dated Jun. 29, 2015.
(Continued)

*Primary Examiner* — Binh B Tran
(74) *Attorney, Agent, or Firm* — Finnegan, Henderson, Farabow, Garrett & Dunner, L.L.P.

(57) ABSTRACT

A self-supporting overhead telecommunication/power cable includes a supporting portion and a transmission portion mutually arranged according to a figure-8 configuration. The transmission portion includes at a central position thereof, an optical fibre conductor and, at a radially outer position with respect to the optical fiber conductor, electrical conductors stranded around the optical fiber conductor. Preferably, the electrical conductors are grouped into sub-units which are stranded around the optical fiber conductor to provide a mechanical protection thereto.

7 Claims, 4 Drawing Sheets

(51) Int. Cl.
*G02B 6/44* (2006.01)
*H01B 11/00* (2006.01)
*H02G 7/12* (2006.01)
*H02G 7/20* (2006.01)
*G02B 6/02* (2006.01)
*H02G 15/117* (2006.01)
*H01B 7/00* (2006.01)
*H01B 7/22* (2006.01)

(52) U.S. Cl.
CPC ......... *G02B 6/4432* (2013.01); *H01B 11/007* (2013.01); *G02B 6/02* (2013.01); *G02B 6/44* (2013.01); *H01B 7/00* (2013.01); *H01B 7/221* (2013.01); *H02G 7/05* (2013.01); *H02G 15/117* (2013.01)

(58) Field of Classification Search
CPC .... G02B 6/4422; G02B 6/3817; H01B 11/00; H01B 7/00; H01B 7/221; H01B 11/22
USPC .............. 174/70 R, 24, 107, 40 R, 41, 70 A; 385/100, 101, 102, 103, 106, 107, 110, 385/113
See application file for complete search history.

(56) References Cited

U.S. PATENT DOCUMENTS

| | | | |
|---|---|---|---|
| 5,651,081 A | 7/1997 | Blew et al. | |
| 5,703,983 A | 12/1997 | Beasley | |
| 5,777,260 A | 7/1998 | Klumps et al. | |
| 5,917,977 A | 6/1999 | Barrett | |
| 6,049,647 A | 4/2000 | Register et al. | |
| 6,861,591 B2 | 3/2005 | Rossi | |
| 8,909,012 B2* | 12/2014 | Register, III et al. | G02B 6/4416 385/101 |
| 2013/0287348 A1 | 10/2013 | Register, III et al. | |
| 2015/0144218 A1* | 5/2015 | Morrow | B29C 47/0023 138/111 |

OTHER PUBLICATIONS

Written Opinion of the International Searching Authority from the European Patent Office in corresponding International Application No. PCT/EP2014/073497, dated Jun. 29, 2015.
Instruction Manual, Installation of Corning Cable Systems Self-Supporting (Figure 8) Aerial Cable, Apr. 2004, Corning Cable Systems SRP-005-026, Issue 7, pp. 1-17, available at https://communicationsengineering.files.wordpress.com/2007/08/ss-aerial-cable-corning.pdf.
Instruction Manual, Figure 8 Installation Guideline, Aug. 13, 2018, pp. 1-14, available at http://superioressexcommunications.com/uploadedFiles/docs/pdf/technical-guidelines/TG43-Figure8-Install-Guide.pdf.
Website: http://www.duraline.com/content/futurepath-figure-8.
Website: http://www.4sproducts.com/atmos-drikore-loose-tube-optical-cables-steel-messenger-self-supporting-fig-8-sheath-single-jacket-single-armor.
Website: https://nordencommunication.com/details?product_id=37.
Thomas Worzyk, Submarine Power Cables, Design, Installation, Repair, Environmental Aspects (Spring 2009) pp. 129-131—marked up.
Website: https://www.elandcables.com/the-cable-lab/faqs/faq-what-is-cable-lay.

* cited by examiner

SELF-SUPPORTING OVERHEAD TELECOMMUNICATION/POWER CABLE

CROSS REFERENCE TO RELATED APPLICATION

This application is a national phase application based on PCT/EP2014/073497, filed Oct. 31, 2014, the content of which is incorporated herein by reference.

BACKGROUND OF THE INVENTION

Field of the Invention

The present invention relates to a self-supporting overhead telecommunication/power cable.

Description of the Related Art

Self-supporting overhead telecommunication/power cables are widely used for aerial or suspension installation comprising a cable suspended in catenary from poles or surrounding buildings. Such cables can include both optical fibre conductors and electrical conductors so as to combine in the same cable the high bit-rate capacity of optical fibre conductors with the electric signal/power carrying capacity of electrical conductors, thus achieving operational and installation benefits for the users.

Among the known self-supporting overhead telecommunication/power cables, the so called figure-8 cables are highly appreciated for allowing cost effective aerial installations. These cables comprise a supporting portion and a transmission portion mutually operatively connected according to a figure-8 configuration. The supporting portion includes a messenger wire intended to be attached to poles during installation, while the transmission portion includes both the optical fibre conductors and the electrical conductors.

The Applicant observed that in installation and operation, the self-supporting overhead telecommunication cables can suffer stresses due to possible external loads. These external loads may be caused, for example, by environmental phenomena, such as ice and/or wind.

Strength and/or protective members should be properly arranged within the cable so as to provide a desired structural strength against the abovementioned external loads and to avoid overloads and strains on the conductors, especially the optical fibre conductors, otherwise the transmission quality might be affected and the optical fibre conductors might break.

"Loose Tube Figure 8—Installation in aerial, up to 80 m span" brochure (Prysmian Group, 2012), relates to a figure-8 optical cable with a central strength member and a plurality of loose tubes SZ stranded around the central strength member and containing optical fibres. Peripheral strength elements are envisaged.

U.S. Pat. No. 5,095,176 relates to a figure-8 aerial cable including a transmission portion and a supporting portion. The transmission portion includes a core having a plurality of transmission media. The transmission media may include a plurality of insulated metallic conductors or a plurality of optical fibers. The core is enclosed in a sheath system. A first component of the sheath system is a metallic shielding layer wrapped around the core. Surrounding the shielding layer is an outer second metallic shield which provides mechanical protection to the cable.

U.S. Pat. No. 6,861,590 relates to a figure-8 cable comprising a load bearing portion and a communication conveying portion. The communication conveying portion includes optical fibers and/or electrical wires. A reinforcing member is provided in the communication conveying portion. The optical fibres are arranged around the reinforcing member. To protect the optical fibers, a relatively soft layer, such as yarn or jell, is provided around the optical fibers and a tape is wrapped around the yarn layer.

U.S. Pat. No. 5,777,260 relates to a coaxial cable having an inner conductor and an outer conductor. An intermediate layer is arranged on the outer conductor. The intermediate layer has depressions in which at least one light waveguide is arranged, the depressions running helically around the cable axis. Reinforcing elements and/or supporting elements can be introduced in the intermediate layer for enhancing the tensile strength. In an embodiment, an 8-shaped cable is provided, wherein two inside spaces are formed. The hybrid cable is accommodated in the larger inside space while in the smaller inside space light waveguides or other transmission elements can be subsequently introduced. The 8-shaped cable can be secured to a carrier cable with continuous clips, so that an aerial cable arises.

U.S. Pat. No. 5,917,977 relates to a composite cable including a core section, a tensile strength section, a conductor and water blocking section, an armor tape and outer jacket. The core section includes a fiber optic conductor disposed inside a buffer tube. The tensile strength section includes strength members, for example impregnated fiberglass members with a helical lay about the buffer tube. The conductor and water blocking section includes twisted pairs conductors stranded about the strength member. The conductor and water blocking section may also include one or more fiber optic conductors. The armor tape comprises for example a steel tape material and provides electrical shielding and protection against rodents. A low-cost easily manufacturable composite cable may be formed without the strength member.

SUMMARY OF THE INVENTION

The Applicant observed that the provision in the known figure-8 cables of strength elements and/or protective elements causes an increase of the cable size and weight, whereas it is instead desired to have self-supporting, overhead cables as small and light as possible so as to provide the least resistance to the environmental phenomena.

In addition, the provision of strength elements and/or protective elements can decrease the cable flexibility, whereas it is instead desired to maintain a sufficient flexibility so as to facilitate the installation operations.

The Applicant found that in a figure-8 self-supporting overhead cable, the electric conductors could act as strength/protective elements for an optical fibre conductor when stranded around the optical fibre conductor positioned at the centre of the transmission portion.

The Applicant obtained a figure-8 self-supporting overhead telecommunication/power cable wherein the desired strengthening and protective action against external loads for an optical fibre conductor is obtained exploiting the presence of the electric conductors for avoiding the need of strength and/or protective members other than the outer sheath, so as not to increase the cable size and weight as well as not to reduce the cable flexibility.

Accordingly, the present invention relates to a self-supporting overhead telecommunication/power cable comprising a supporting portion and a transmission portion mutually arranged according to a figure-8 configuration, wherein the transmission portion comprises, at a central position thereof, an optical fibre conductor and, at a radially outer position with respect to the optical fibre conductor, electrical conductors stranded around said optical fibre conductor.

The optical fibre conductor can comprise a single optical fibre or, preferably, a plurality of optical fibres, and a buffer tube housing the optical fibre/s.

Optical fibres particularly suitable for the present invention are of the type E G657A1 or G657A2.

The buffer tube is preferably made of a polymeric material. Polybutylene terephthalate (PBT) is a particularly preferred material. More preferably, the buffer tube is made of a polymeric material having a tensile modulus of from 2 to 5 MPa.

In the cable of the invention, the arrangement of the optical fibre conductor at the centre of the transmission portion and the stranding of the electrical conductors around the optical fibre conductor allows the optical fibre conductor to be suitably protected against external loads which the cable can be subjected to in operation and provides the transmission portion of the cable with the desired structural strength with no need to provide therein additional strengthening and/or protective members. Indeed the electrical conductors themselves act as both strength elements within the transmission portion of the cable and protective elements for the optical fibre conductor.

The desired strengthening and protective action can be attained by arranging electrical conductors substantially equally spaced from each other and stranded around the optical fibre conductor. In the case of three electrical conductors, they are angularly arranged at 120° from each other around the optical fibre conductor; in the case of four electrical conductors, they are angularly arranged at 90° from each other around the optical fibre conductor, and so forth.

Preferably, at least three electrical conductors are arranged and stranded around the optical fibre conductor.

More preferably, more than three electrical conductors are arranged and stranded around the optical fibre conductor so as to provide a higher protection against the external loads as well as a greater structural strength, further to increasing the telecommunication transmission capacity of the cable.

Advantageously, the electrical conductors are substantially equally distributed and stranded around the optical fibre conductor or equally grouped into sub-units which are stranded around the optical fibre conductor. The substantially equal distribution or grouping of the electrical conductors around the optical fibre conductor helps to maintain the optical fibre conductor in the central position and to prevent any distortion and harmful bending thereof.

An electrical conductor of the present invention can be an individual conductor comprising a conductive core, made of electrically conductive metal, and an insulating layer surrounding such core, made of an electrically insulating polymer material. A protective sheath can surround the insulating layer.

The individual electrical conductors can transport power, in particular low voltage (less than 1 kV) power.

An electrical conductor of the present invention can be a copper pair, each copper pair comprising two insulated electrical conductors, optionally twisted one another. The insulated conductors of the pair can be covered by a common jacket in polymeric material.

The copper pairs can be used for telecommunication and data transport.

The cable of the present invention can comprise both individual electrical conductors and copper pairs.

Preferred arrangements of copper pairs provides for five sub-units each comprising two copper pairs or four sub-units each comprising four copper pairs, the sub-units being advantageously SZ-stranded around the buffer tube.

Preferably, the transmission portion of the cable of the invention comprises, at a radially outer position with respect to the optical fibre conductor, electrical conductors grouped into sub-units which are stranded around the optical fibre conductor. Specific advantages are obtained by equally grouping the electrical conductors into the sub-units, more preferably in at least three sub-units.

Greater advantages are achieved by providing in each of the just mentioned sub-units a number of electrical conductors, for example nine for each sub-unit.

The sub-units are preferably substantially equally spaced apart from each other around the optical fibre conductor.

The uniform distribution of the sub-units or of the electrical conductors around the optical fibre conductor, in combination with the stranding of the sub-units or of the individual electrical conductors around the optical fibre conductor, allows a homogeneous protective and strengthening action both in the circumferential direction and in the longitudinal direction of the transmission portion, and lower or avoid the risk of deformation of the optical fibre conductor buffer tube.

The electrical conductors can be stranded together, preferably according to a SZ configuration.

Preferably, the sub-units are stranded according to a SZ configuration around the optical fibre conductor.

The stranding of the electrical conductors or of the sub-units around the optical fibre conductor, as well as the stranding of the electrical conductors within the sub-units, provide the supporting portion of the cable with the capability to effectively absorb possible traction stresses before propagation thereof to the optical fibre conductor. The SZ stranding configuration allows a better manufacturing speed and continuous length and permits cable preparation easier for mid-span access.

Preferably, each sub-unit comprises a tape made of polymeric material enveloping the electrical conductors arranged therein.

Preferably, the transmission portion comprises an outer tape wrapping the electrical conductors and, as a consequence, the optical fibre conductor, and arranged in a radial internal position with respect to the outer sheath. Said outer tape is preferably made of polymeric material or of polymer/aluminium. This outer tape is useful in the manufacturing to stop sticking to the sheath and/or in operation to assist with cable stripping.

The supporting portion of the cable of the invention is used to connect the cable to the poles and has a load-bearing function.

Preferably, the self-supporting overhead telecommunication cable comprises a figure-8 shaped outer sheath enclosing both said supporting portion and said transmission portion.

Preferably, the cable of the invention further comprises a water-blocking filling material in order to prevent the transmission portion to possibly convey water therein. The water-blocking filling material can be provided in any position within the outer sheath surrounding the transmission portion. In the case the transmission portion comprises a buffer tube surrounding the optical fibre conductor, the water-blocking filling material can be provided inside and/or outside the buffer tube.

Advantageously, the cable of the invention further comprises a moisture barrier in form of a metal tape, preferably an aluminium tape, lining the inner surface of the outer sheath surrounding the transmission portion.

The moisture barrier improves the protection of the transmission portion against water and moisture and ensures a long term standing electrical insulation and mechanical resistance.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

BRIEF DESCRIPTION OF THE DRAWINGS

Further features and advantages of the present invention will appear more clearly from the following detailed description of preferred embodiments thereof, such description being provided merely by way of non-limiting example and being made with reference to the annexed drawings. In such drawings.

DETAILED DESCRIPTION OF THE INVENION

Figure 1:
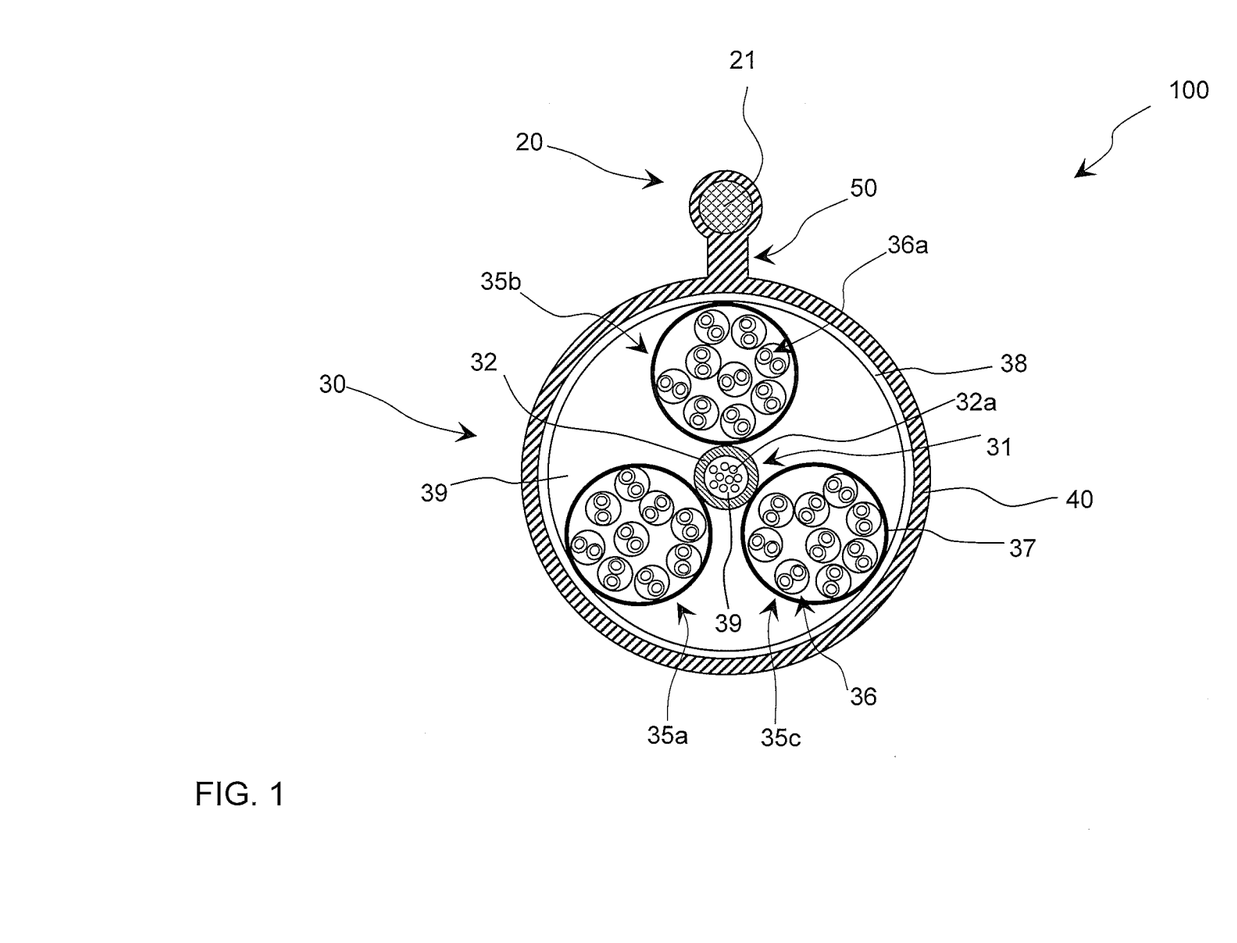
FIG. 1 is a schematic cross-section view of a self-supporting overhead telecommunication/power cable according to an exemplary embodiment of the present invention.

In FIG. 1, an embodiment of a self-supporting overhead telecommunication/power cable according to the present invention is indicated with numeral reference 100.

The cable 100 comprises a supporting portion 20 and a transmission portion 30 mutually arranged according to a figure-8 configuration.

The supporting portion 20 and the transmission portion 30 are defined in distinct portions of a figure-8 outer sheath 40 made of polymeric material, preferably high density polyethylene (HDPE). The sheath 40 includes an intermediate portion 50 mutually connecting the supporting portion 20 and the transmission portion 30.

Both the supporting portion 20 and the transmission portion 30 have a substantially circular cross-section.

The supporting portion 20 comprises a messenger wire 21, possibly made of glass-reinforced polymer or, preferably, of steel, intended to be attached to poles (not shown) during installation of the cable 100.

The transmission portion 30 comprises, at the central position thereof, an optical fibre conductor 31 comprising a buffer tube 32 housing a plurality of optical fibres 32a.

The buffer tube 32 is coaxially arranged within the transmission portion 30.

The number of optical fibres 32a within the buffer tube 32 can vary depending on the transmission requirements. This number can vary, for example, from 1 to 12.

Each optical fibre 32a comprises a glass core and, at a radially outer position with respect to the glass core, one or two coatings made of a polymeric material, for example acrylate.

The buffer tube 32 is made of polymeric material, for example polybutylene terephthalate.

The transmission portion 30 further comprises, at a radially outer position with respect to the optical fibre conductor 31, three sub-units 35a, 35b, 35c each including nine copper pairs 36. For the sake of clarity of illustration, the reference number 36 is associated to just one of the abovementioned copper pairs.

The copper pairs 36 are stranded together and wrapped by a tape 37 made of polymeric material, for example polypropylene.

The number of sub-units 35a, 35b, 35c can be greater than three as well as the number of copper pairs 36 inside each sub-unit 35a, 35b, 35c can be lower or greater than nine (for example from two to one hundred), depending on the transmission requirements. In the present case, the copper pairs 36 are equally divided into the sub-units 35a, 35b, 35c.

Preferably, the sub-units 35a, 35b, 35c are substantially equally spaced apart from each other around the optical fibre conductor 31. Thus, in the embodiment shown in FIG. 1, the three sub-units 35a, 35b, 35c are angularly arranged at 120° from each other around the optical fibre conductor 31.

Figure 2:
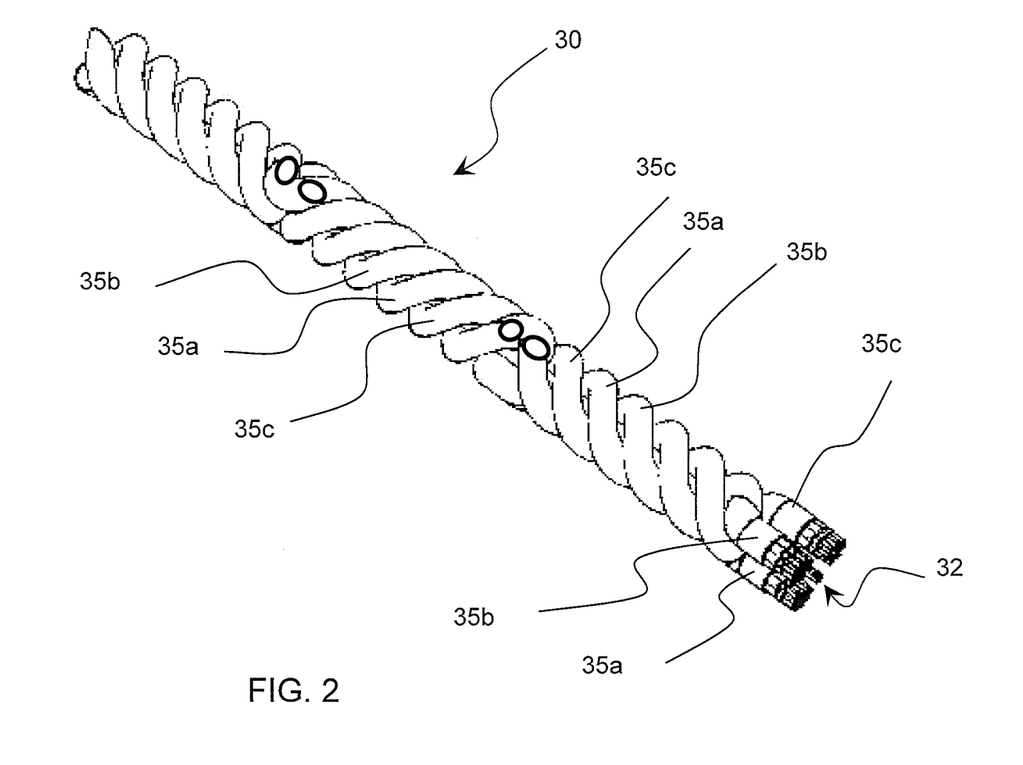
FIG. 2 is a schematic perspective view of a part of the cable of FIG. 1.

As shown in FIG. 2, the sub-units 35a, 35b, 35c of the cable of FIG. 1 are stranded around the optical fibre conductor 31.

FIG. 2 shows the transmission portion 30 of the cable 100 without the outer tape 38 mentioned below.

The sub-units or, in the case, the individual electrical conductors, are capable to provide the transmission portion with a suitable structural strength and protect the optical fibre conductor against external loads which the cable can be subjected to in installation and/or operation. No additional protective and/or strengthening elements are thus required, so as not to avoid an increase of the size and weight of the cable and a reduction of the cable flexibility.

Preferably, the sub-units 35a, 35b, 35c are SZ stranded around the optical fibre conductor 31.

As shown in FIG. 1, each copper pair 36 comprises a twisted pair of telecommunication conductors 36a, each comprising a copper wire covered by an electrical insulation layer made of polymeric material, for example polyethylene. For the sake of clarity of illustration, the reference number 36a is associated to just one telecommunication conductor in each sub-unit 35a, 35b, 35c.

An outer tape 38 is provided in the transmission portion 30 to wrap the sub-units 35a, 35b, 35c around the optical fibre conductor 31. The tape 38 is preferably made of a polymeric material, for example polyester. The tape 38 can be longitudinally or helically applied onto the sub-units 35a, 35b, 35c.

A water-blocking filling material 39 is provided to embed the sub-units 35a, 35b, 35c and the optical fibre conductor 31 in order to prevent any water flow within the transmission portion 30. The water-blocking filling material 39 is also provided inside the buffer tube 32 to embed the optical fibers 32a.

At least one rip cord (not shown) can be provided in the transmission portion 30 and possibly in the supporting portion 20 as well.

Figure 3:
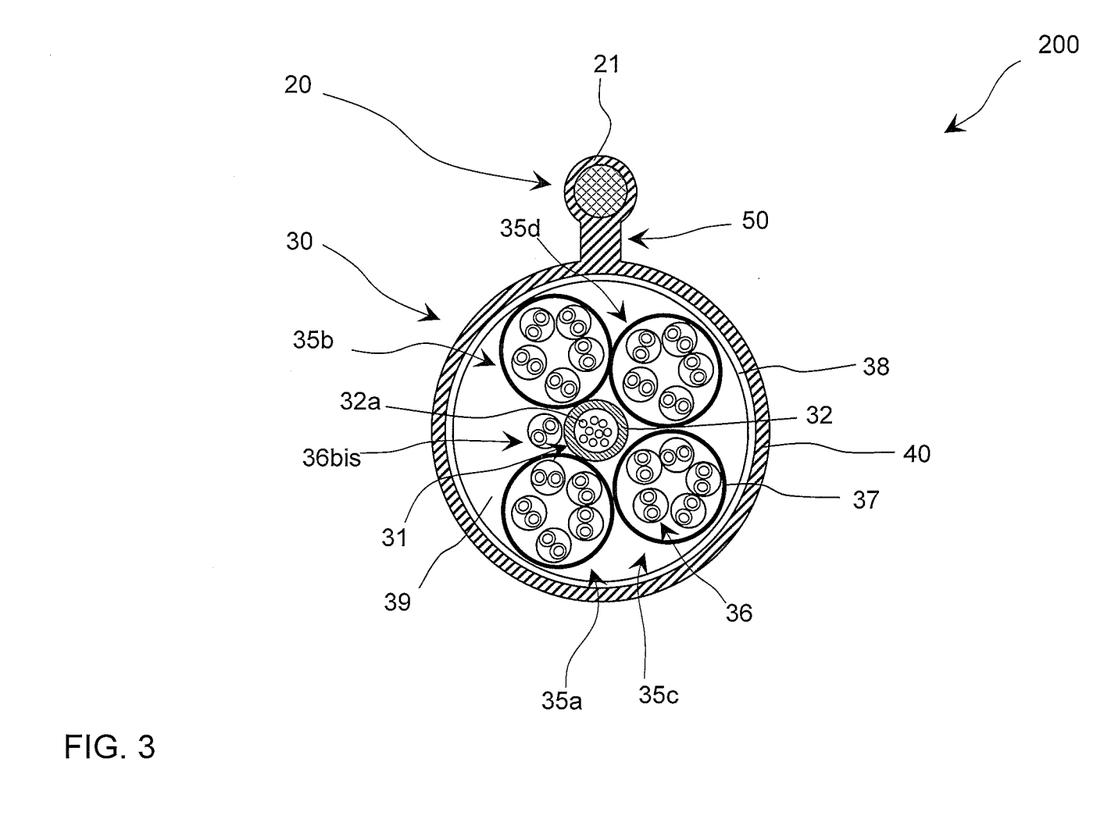
FIG. 3 is a schematic cross-section view of another self-supporting overhead telecommunication/power cable according to an exemplary embodiment of the present invention.

FIG. 3 shows another embodiment of a self-supporting overhead telecommunication/power cable according to the present invention, which is indicated with numeral reference 200.

Unless specified, all of the reference numbers of FIG. 3 indicate the same cable elements as from the description of FIG. 1.

Cable 200 has a transmission portion 30 comprising, at a radially outer position with respect to the optical fibre conductor 31, four sub-units 35a, 35b, 35c, 35d each including five copper pairs 36, stranded together and wrapped by a tape 37.

A single copper pair 36bis is also stranded around the optical fibre conductor 31 together with the sub-units 35a, 35b, 35c, 35d.

In cable 200 a water-blocking filling material 39 is provided to embed the sub-units 35a, 35b, 35c, 35d, the copper pair 36bis and the optical fibre conductor 31. The water-blocking filling material 39 is not provided into the buffer tube 32.

Figure 4:
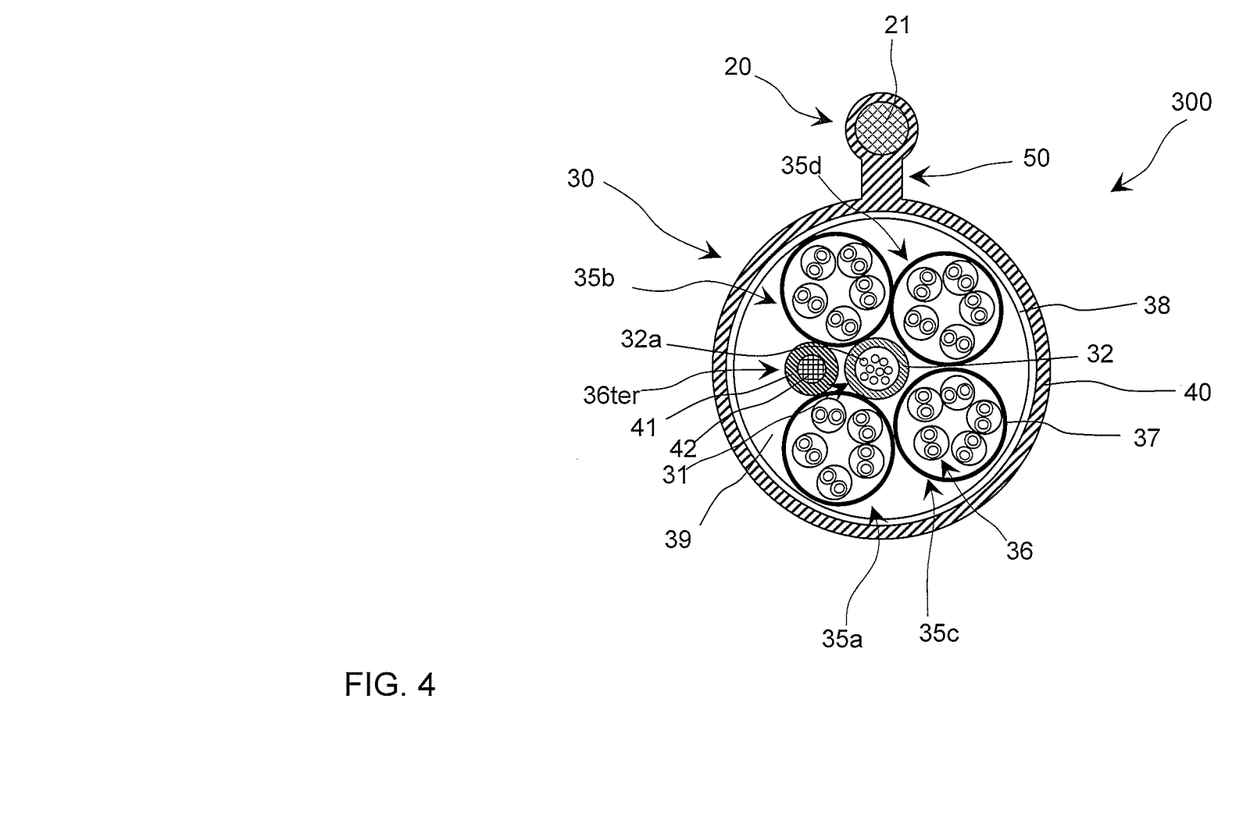
FIG. 4 is a schematic cross-section view of a further self-supporting overhead telecommunication/power cable according to an exemplary embodiment of the present invention.

FIG. 4 shows a further embodiment of a self-supporting overhead telecommunication/power cable according to the present invention, which is indicated with numeral reference 300.

Unless specified, all of the reference numbers of FIG. 4 indicate the same cable elements as from the description of FIG. 1.

Cable 300 has a transmission portion 30 comprising, at a radially outer position with respect to the optical fibre conductor 31, four sub-units 35a, 35b, 35c, 35d each including five copper pairs 36, stranded together and wrapped by a tape 37.

An individual electric conductor 36ter (comprising a conductive core 42 surrounded by an electrically insulating layer 41) is also stranded around the optical fibre conductor 31 together with the sub-units 35a, 35b, 35c, 35d.

In cable 300 a water-blocking filling material 39 is provided to embed the sub-units 35a, 35b, 35c, 35d, the individual electric conductor 36ter and the optical fibre conductor 31. The water-blocking filling material 39 is not provided into the buffer tube 32.

TESTS

The Applicant has made a number of tests on cables 100 according to the invention.

The tested cables included a buffer tube housing up to twelve optical fibres of the type E (G657A1).

Each optical fibre had an inner diameter (core diameter) of 1.8±0.1 mm and an outer diameter (cladding diameter) of 3.0±0.1 mm.

Each copper pair included two annealed solid copper wires having each a nominal diameter of 0.5 mm and each surrounded by an insulation layer made of polyethylene and having a nominal diameter of 1.3 mm.

Tree sub-units each comprised nine telecommunication copper pairs SZ-stranded around the buffer tube.

The copper pairs of each sub-unit were wrapped with a layer of polyester material having a thickness and a width of 2.8±0.4 mm.

The transmission portion was filled with a water-blocking jelly.

The transmission portion had an outer tape of polyester material with a thickness of 0.05 mm.

The supporting portion included a steel messenger wire having a diameter of 2.65 mm.

The outer sheath of the cables, made of HDPE, had a thickness of 1.3 mm both in the supporting portion and the transmission portion.

The cables had a weight of about 400 Kg/km and a diameter of 18×27 mm. The cable maximum diameter was 23×32 mm.

The cables were subjected to quality tests for both the optical conductors and the electrical conductors. In particular, the optical fibres were subjected to attenuation tests according to IEC 60794-1-2 and the electrical conductors were subjected to electrical performance tests according to IEC 60708.

The mechanical and transmission properties of the tested cables are listed in tables 1-5 below.

TABLE 1

| Electrical property at 20° C. | Requirement | | Result |
|---|---|---|---|
| Conductor resistance (/km) | Max. average | 91 | 85.8 |
| | Max. for 99% | 96 | 86.3 |
| Mutual Capacitance (nF/km) | Max. average | 56 | 41.87 |
| | Max. for 99% | 64 | 43.1 |
| Insulation Resistance @ 500 V DC | Min. (M · km) | 1500 | >1500 |
| Voltage test core/core | 1000 V DC, 60 s | no breakdown | passed |

TABLE 2

| Attenuation at 20° C. | | | | | |
|---|---|---|---|---|---|
| | | | | Attenuation (dB/Km) | |
| Buffer tube | | Optical fibre | | 1310 nm | 1550 nm |
| No. | Colour | No. | Colour | max 0.36 | max 0.22 |
| 1 | blue | 1 | red | 0.314 | 0.183 |
| | | 2 | green | 0.315 | 0.184 |
| | | 3 | blue | 0.315 | 0.175 |
| | | 4 | yellow | 0.317 | 0.185 |
| | | 5 | white | 0.317 | 0.190 |
| | | 6 | grey | 0.314 | 0.186 |
| | | 7 | brown | 0.310 | 0.186 |
| | | 8 | violet | 0.318 | 0.193 |
| | | 9 | turquoise | 0.318 | 0.200 |
| | | 10 | black | 0.317 | 0.177 |
| | | 11 | orange | 0.310 | 0.177 |
| | | 12 | pink | 0.314 | 0.185 |

The cable water tightness was evaluated on 3 m-long cables in 1 m-high water for 24 hours. No water was found at the open cable end.

TABLE 3

| Attenuation at −20° C. | | | | | |
|---|---|---|---|---|---|
| | | | | Attenuation (dB/Km) | |
| Buffer tube | | Optical fibre | | 1310 nm | 1550 nm |
| No. | Colour | No. | Colour | max 0.36 | max 0.22 |
| 1 | blue | 1 | red | 0.322 | 0.176 |
| | | 2 | green | 0.312 | 0.171 |
| | | 3 | blue | 0.307 | 0.179 |
| | | 4 | yellow | 0.301 | 0.187 |
| | | 5 | white | 0.301 | 0.170 |
| | | 6 | grey | 0.309 | 0.188 |
| | | 7 | brown | 0.308 | 0.192 |
| | | 8 | violet | 0.302 | 0.176 |

TABLE 3-continued

Attenuation at −20° C.

| Buffer tube | | Optical fibre | | Attenuation (dB/Km) | |
| --- | --- | --- | --- | --- | --- |
| | | | | 1310 nm | 1550 nm |
| No. | Colour | No. | Colour | max 0.36 | max 0.22 |
| | | 9 | turquoise | 0.300 | 0.171 |
| | | 10 | black | 0.309 | 0.178 |
| | | 11 | orange | 0.319 | 0.187 |
| | | 12 | pink | 0.313 | 0.178 |

TABLE 4

Attenuation at +60° C.

| Buffer tube | | Optical fibre | | Attenuation (dB/Km) | |
| --- | --- | --- | --- | --- | --- |
| | | | | 1310 nm | 1550 nm |
| No. | Colour | No. | Colour | max 0.36 | max 0.22 |
| 1 | blue | 1 | red | 0.322 | 0.214 |
| | | 2 | green | 0.334 | 0.205 |
| | | 3 | blue | 0.330 | 0.194 |
| | | 4 | yellow | 0.310 | 0.214 |
| | | 5 | white | 0.317 | 0.190 |
| | | 6 | grey | 0.321 | 0.188 |
| | | 7 | brown | 0.310 | 0.209 |
| | | 8 | violet | 0.313 | 0.183 |
| | | 9 | turquoise | 0.310 | 0.180 |
| | | 10 | black | 0.332 | 0.187 |
| | | 11 | orange | 0.325 | 0.182 |
| | | 12 | pink | 0.328 | 0.193 |

All of the cables tested passed each test, thus confirming that the cable according to the invention is capable of being effectively used in aerial installation for communication/data transfer without suffering of attenuation and performance problems.

The invention claimed is:

1. A self-supporting overhead telecommunication/power cable comprising a single supporting portion and a transmission portion mutually arranged according to a figure-8 configuration, wherein the single supporting portion comprises messenger wire, and further wherein the transmission portion comprises, at a central position thereof, an optical fibre conductor and, at a radially outer position with respect to the optical fibre conductor, copper pairs grouped into subunits stranded around said at least one optical fibre conductor, wherein the copper pairs are stranded together and surrounded by a tape consisting of a polymeric material, each copper pair comprising two insulated electrical conductors twisted about one another.

2. The self-supporting overhead telecommunication/power cable according to claim 1, wherein said at least one optical fibre conductor comprises a plurality of optical fibres housed in a buffer tube.

3. The self-supporting overhead telecommunication/power cable according to claim 1, wherein at least three subunits are arranged and stranded around the optical fibre conductor.

4. The self-supporting overhead telecommunication/power cable according to claim 1, further comprising additional electrical conductors selected from individual electrical conductors, copper pairs and a combination thereof.

5. The self-supporting overhead telecommunication/power cable according to claim 1, wherein said transmission portion comprises a water blocking filling material.

6. The self-supporting overhead telecommunication/power cable according to claim 1, comprising a figure-8 shaped outer sheath enclosing said supporting portion and said transmission portion.

7. The self-supporting overhead telecommunication/power cable according to claim 6, wherein the transmission portion comprises an outer tape wrapping the subunits and the optical fibre conductor and arranged in a radial internal position with respect to the outer sheath.

* * * * *